United States Patent
Matsumoto (10) Patent No.: US 7,266,266 B2
(45) Date of Patent: Sep. 4, 2007

(54) OPTICAL FUNCTIONAL DEVICE BASED ON MACH-ZEHNDER INTERFEROMETER

(75) Inventor: Keisuke Matsumoto, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 244 days.

(21) Appl. No.: 10/825,119

(22) Filed: Apr. 16, 2004

(65) Prior Publication Data
US 2005/0129356 A1 Jun. 16, 2005

(30) Foreign Application Priority Data
Dec. 16, 2003 (JP) ............................. 2003-418518

(51) Int. Cl.
*G02B 6/26* (2006.01)
*G02F 1/225* (2006.01)
(52) U.S. Cl. .................... 385/27; 385/3; 359/326
(58) Field of Classification Search .................... None
See application file for complete search history.

(56) References Cited

U.S. PATENT DOCUMENTS

| | | | |
|---|---|---|---|
| 5,933,554 A * | 8/1999 | Leuthold et al. ............... 385/28 |
| 6,169,824 B1 * | 1/2001 | Sigogne et al. ................. 385/3 |
| 6,337,762 B1 * | 1/2002 | Ueno .......................... 359/332 |
| 6,421,155 B1 | 7/2002 | Yano | |
| 2003/0002797 A1 * | 1/2003 | Chu et al. ...................... 385/39 |
| 2004/0001247 A1 * | 1/2004 | Nojima ........................ 359/326 |
| 2005/0100281 A1 * | 5/2005 | Kim et al. ...................... 385/39 |

FOREIGN PATENT DOCUMENTS

JP 10-332939 12/1998

OTHER PUBLICATIONS

F. Ratovelomanana et al. Regeneration improvement in all-optical wavelength converter, based on a Mach-Zehnder interferometer, by means of phase-shifter section. Electronics Letters, vol. 33 No. 19, pp. 1629-1630, Sep. 1997.*

* cited by examiner

Primary Examiner—Rodney Bovernick
Assistant Examiner—Mike Stahl
(74) Attorney, Agent, or Firm—Leydig, Voit & Mayer, Ltd.

(57) ABSTRACT

An optical device for optical communication includes a first main electrode disposed between a first splitter and a second splitter on a first arm. A first auxiliary electrode is disposed between the second splitter and a third splitter on the first arm. A second main electrode and a second auxiliary electrode are disposed between a third splitter and a fourth splitter on a second arm. The second main electrode is provided on the second arm at the first port side, and the second auxiliary electrode is provided on the second arm at the second port side. By such disposition of the first and second auxiliary electrodes, input signal light applied through a third port or a fourth port acts on the first main electrode prior to the first and second auxiliary electrodes. Therefore, the input signal light will not be affected by the first and second auxiliary electrodes.

8 Claims, 9 Drawing Sheets

OPTICAL FUNCTIONAL DEVICE BASED ON MACH-ZEHNDER INTERFEROMETER

BACKGROUND OF THE INVENTION

1. Field of the Invention

The present invention relates to an optical functional device and a fabrication method thereof, more particularly, an optical functional device based on a Mach-Zehnder interferometer and a fabrication method of such an optical functional device.

2. Description of the Background Art

Attention is now focused on the wavelength division multiplex (WDM) technique to improve the transmission capacity of optical fibers. The usage of WDM technique allows the transmission ability of an optical fiber already installed to burst up to more than several ten times. The wavelength converter is known as one optical functional device employed in the light wave network of multiple wavelength. The wavelength converter is an important optical device indispensable in the WDM optical communication technique.

The wavelength converter converts the wavelength of input signal light into another wavelength differing from that of the input signal light. Wavelength conversion allows wavelength routing to be conducted at another site in the light wave network. Accordingly, all-optical network architecture in the future will become possible.

A conventional wavelength converter is based on, for example, a Mach-Zehnder interferometer, providing output signal light of a wavelength differing from that of the input signal light through constant light. F. Ratovelomanana et al. present "Regeneration improvement in all-optical wavelength converter, based on a Mach-Zehnder interferometer, by means of phase-shifter section", Electronics Letters, The Institution of Electrical Engineers (IEE), Sep. 11, 1997, Vol. 33, No. 19, pp. 1629-1630. A conventional wavelength converter disclosed therein includes a phase control element in addition to a semiconductor optical amplifier (SOA) that amplifies constant light and modifies the refractive index. The phase control element is directed to adjust the phase difference of constant light split to two arms of a Mach-Zehnder interferometer. The provision of a phase control element in addition to a semiconductor optical amplifier allows the extinction ratio of the output signal light to be improved.

Some conventional wavelength converters (optical functional device) have a configuration in which the input signal light as well as the constant light passes through the phase control element of the Mach-Zehnder interferometer. In this case, there was the disadvantage of the intensity of the input signal light being attenuated by the phase control element depending on where the signal light is input.

SUMMARY OF THE INVENTION

An object of the present invention is to provide an optical functional device that does not have the intensity of input signal light attenuated by a phase control element, and a fabrication method of such an optical functional device.

According to an aspect of the present invention, an optical functional device includes a first port, a second port, a first splitter branching said first port to a first arm and a second arm, a second splitter branching said second port to said first arm and said second arm, a first semiconductor optical amplifier disposed on said first arm, a second semiconductor optical amplifier disposed on said second arm, and a phase control element disposed between said first semiconductor optical amplifier and said second splitter on said first arm. Constant light is input from either said first port or said second port. Input signal light is input from either a site between said first splitter and said first semiconductor optical amplifier or another site between said first semiconductor optical amplifier and said phase control element.

According to another aspect of the present invention, an optical functional device includes a first port, a second port, a first splitter branching said first port to a first arm and a second arm, a second splitter branching said second port to said first arm and said second arm, a first semiconductor optical amplifier disposed on said first arm, a second semiconductor optical amplifier disposed on said second arm, a first phase control element disposed between said first semiconductor optical amplifier and said second splitter on said first arm, and a second phase control element disposed between said second semiconductor optical amplifier and said second splitter on said second arm. Constant light is input from either said first port or said second port. Input signal light is input from either a site between said first splitter and said first semiconductor optical amplifier or another site between said first semiconductor optical amplifier and said first phase control element.

According to a further aspect of the present invention, a fabrication method of an optical functional device includes: an optical waveguiding layer production step of sequentially forming a clad layer of a first conductivity type, an optical amplifying layer, and a first clad layer of a second conductivity type on a semiconductor substrate; a waveguide production step of composition-modifying a part of the clad layers of the first conductivity type and the second conductivity type to a clad layer of a third conductivity type, and a part of the optical amplifying layer to an optical waveguide layer; a waveguide ridge production step of forming a waveguide ridge by removing partially the clad layer of the first conductivity type, the optical amplifying layer, and the first clad layer of the second conductivity type respectively; an embed growth production step of forming a semiconductor layer of a second conductivity type respectively at both sides of the waveguide ridge so as to embed a semiconductor block of the first conductivity type, and sequentially forming a second clad layer of the second conductivity type and a contact layer above the semiconductor layer of the second conductivity type and the first clad layer of the second conductivity type; a surface electrode production step of forming an insulation layer at the top of the contact layer and removing the insulation layer partially to form a contact electrode at the region where the insulation layer was removed; and a back electrode production step of forming an electrode at the backside of the semiconductor substrate.

In accordance with the present invention, the light intensity of the input signal light is not attenuated by the phase control element.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings. In the drawings, the same or corresponding components have the same reference characters allotted, and description thereof will not be repeated.

Figure 1:
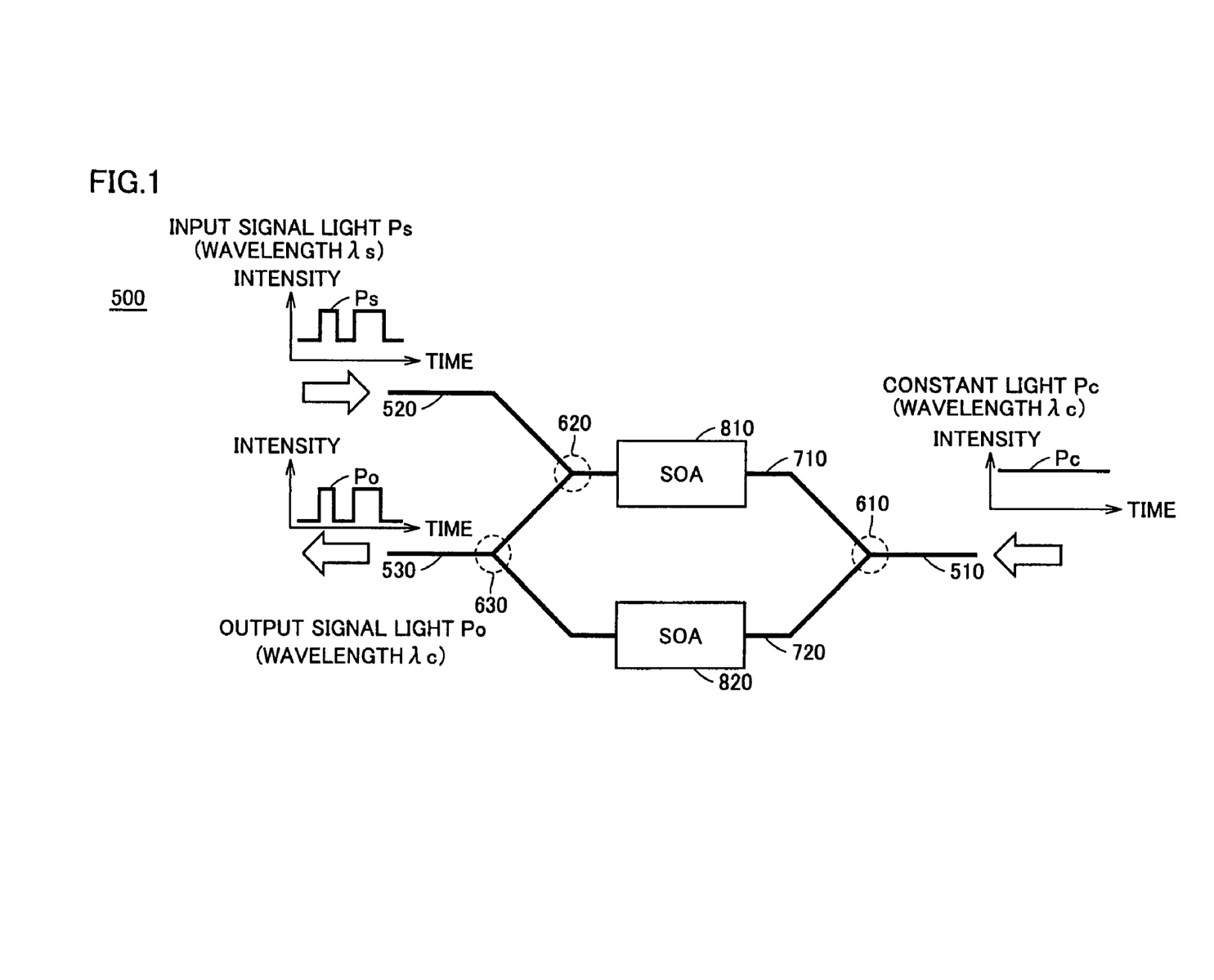
FIG. 1 is a schematic diagram of a configuration of a wavelength converter 500 as the background to describe wavelength converters in accordance with respective embodiments of the present invention.

FIG. 1 schematically shows a configuration of a wavelength converter 500 as the background to describe a wavelength converter (optical functional device) in accordance with respective embodiments of the present invention.

Referring to FIG. 1, wavelength converter 500 is based on a Mach-Zehnder interferometer, and includes a constant light input port 510, a signal light input port 520, a signal light output port 530, a splitter 610, couplers 620 and 630, arms 710 and 720, and semiconductor optical amplifiers (SOA) 810 and 820.

Constant light Pc (wavelength $\lambda c$) input through constant light input port 510 is split to arm 710 and arm 720 at splitter 610. Constant light Pc split to arms 710 and 720 is amplified at semiconductor optical amplifiers 810 and 820, respectively. The light amplified at each of semiconductor optical amplifiers 810 and 820 is coupled at coupler 630. The light coupled at coupler 630 is output from signal light output port 530 as output signal light Po (wavelength $\lambda c$).

Input signal light Ps (wavelength $\lambda s$) input through signal light input port 520 is applied to semiconductor optical amplifier 810 of arm 710 via coupler 620. Entry of input signal light Ps into semiconductor optical amplifier 810 causes change in the phase of constant light Pc split to arm 710 from splitter 610. This change in the phase of constant light input to a semiconductor optical amplifier in accordance with input signal light is called cross phase modulation (XPM).

By the XPM effect, output signal light Po (wavelength $\lambda c$) is modulated in accordance with the entry of input signal light Ps (wavelength $\lambda s$) modulated as shown in FIG. 1. In other words, input signal light Ps of wavelength $\lambda s$ can be thought of as being wavelength-converted into output signal light Po of wavelength $\lambda c$ by the XPM effect. The operating mechanism of wavelength conversion by the XPM effect will be described, based on wavelength converter 500 set forth above, with reference to FIGS. 2-4.

Figure 2:
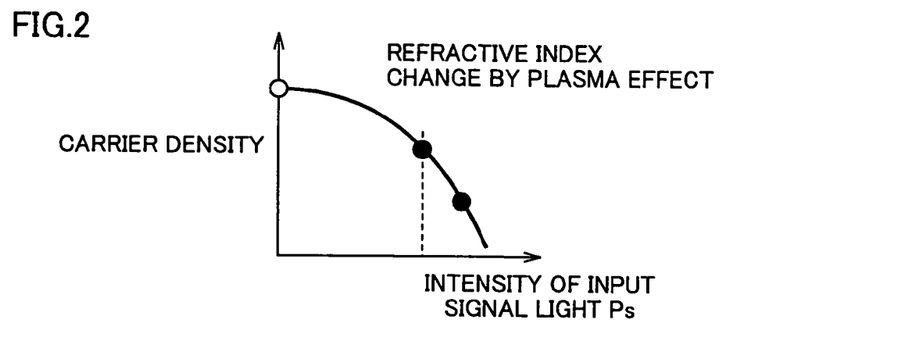
FIG. 2 shows the change of the carrier density in a semiconductor optical amplifier 810 in accordance with the intensity of input signal light Ps applied to semiconductor optical amplifier 810.

FIG. 2 represents the change of the carrier density in semiconductor optical amplifier 810 in accordance with the intensity of input signal light Ps applied to semiconductor optical amplifier 810.

Referring to FIG. 2, stimulated emission at semiconductor optical amplifier 810 increases as the intensity of input signal light Ps becomes higher, which in turn causes reduction in the carrier density of semiconductor optical amplifier 810. Reduction in the carrier density of semiconductor optical amplifier 810 causes alteration in the refractive index of semiconductor optical amplifier 810.

Figure 3:
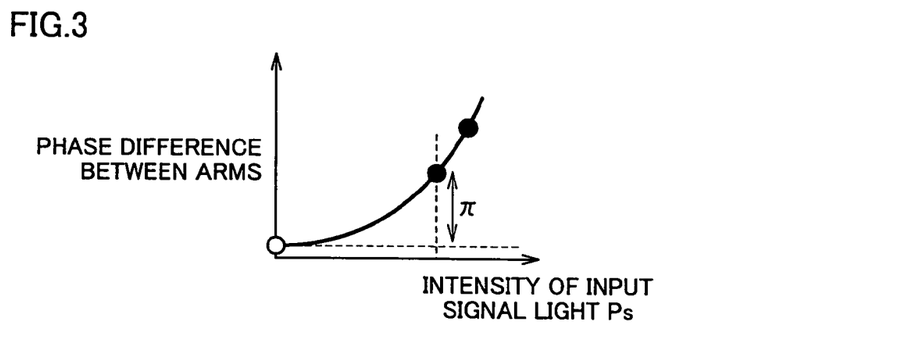
FIG. 3 shows the change of the phase difference between arms of constant light Pc in accordance with the intensity of input signal light Ps applied to semiconductor optical amplifier 810.

FIG. 3 represents the change of the phase difference between arms of constant light Pc in accordance with the intensity of input signal light Ps applied to semiconductor optical amplifier 810.

As described with reference to FIG. 2, increase in the intensity of input signal light Ps causes alteration in the refractive index of semiconductor optical amplifier 810. This alteration in the refractive index of semiconductor optical amplifier 810 will lead to greater difference in refractive index between semiconductor optical amplifier 810 and semiconductor optical amplifier 820. Therefore, increase in the intensity of input signal light Ps causes a larger phase difference of constant light Pc between arms. It is to be noted that, due to the phase behavior, the phase difference of constant light Pc between arms increases, not plainly, but substantially in circularity between 0 to π in accordance with the intensity of input signal light Ps.

Figure 4:
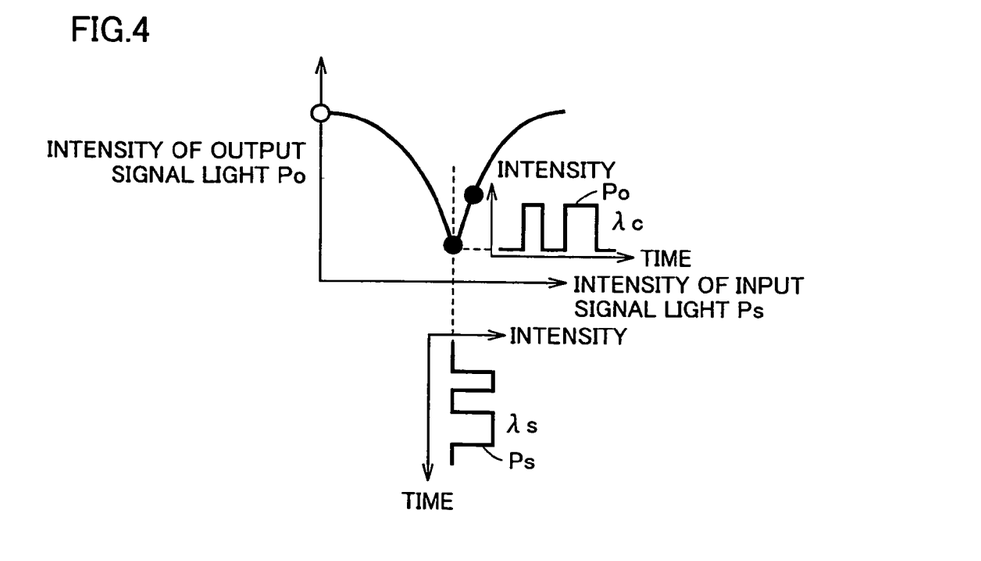
FIG. 4 shows the change of the intensity of output signal light Po in accordance with the intensity of input signal light Ps applied to a wavelength converter 500.

FIG. 4 represents change in the intensity of output signal light Po in accordance with the intensity of input signal light Ps applied to wavelength converter 500.

As described with reference to FIG. 3, increase in the intensity of input signal light Ps causes the phase difference of constant light Pc between arms to vary in circularity between 0 to π, which in turn causes the intensity of output signal light Po that is a split and coupled version of constant light Pc to change in accordance with the phase difference of constant light Pc between arms, as shown in FIG. 4. As a result, output signal light Po (wavelength λc) is modulated in response to the modulation of input signal light Ps (wavelength λs) as shown in FIG. 4.

By the operating mechanism set forth above, wavelength converter 500 converts input signal light Ps of wavelength λs into output signal light Po of wavelength λc. The configuration of wavelength converter 100 having a phase control element provided at the arm of the Mach-Zehnder interferometer in addition to the semiconductor optical amplifier (SOA) will be described hereinafter. The phase control element is directed to improve the extinction ratio of the output signal light by adjusting the phase difference of the constant light split to the two arms of the Mach-Zehnder interferometer.

In the following, the term of "main electrode" generally formed at the top most face of a semiconductor optical amplifier will be used instead of the term "semiconductor optical amplifier (SOA)". Also, the term "auxiliary electrode" generally formed at the top most face of a phase control element will be used instead of the term "phase control element". A specific configuration of the semiconductor optical amplifier and phase control element will be exemplified together with the fabrication method of the eighth embodiment. In the following, the splitter and the coupler are generically referred to as "splitter" hereinafter.

Figure 5:
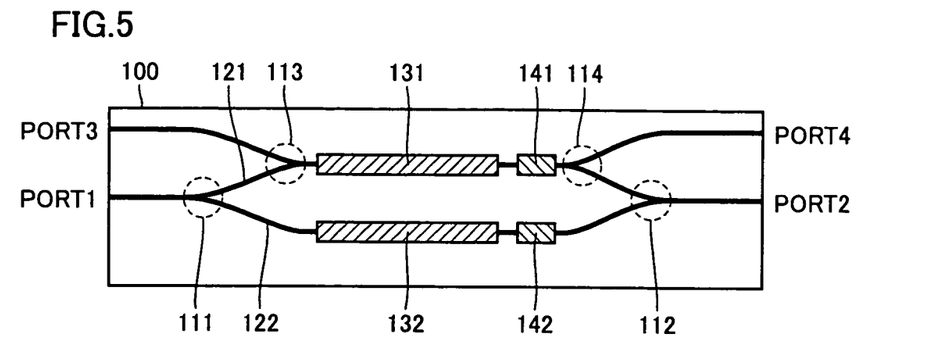
FIG. 5 is a schematic diagram of a configuration of a wavelength converter 100 as the background to describe wavelength converters in accordance with respective embodiments of the present invention.

FIG. 5 schematically shows a configuration of a wavelength converter 100 as the background of describing a wavelength converter in accordance with respective embodiments of the present invention.

Referring to FIG. 5, wavelength converter 100 is based on a Mach-Zehnder interferometer, and includes splitters 111-114, arms 121 and 122, main electrodes 131 and 132, and auxiliary electrodes 141 and 142. The optical path including arms 121 and 122 is formed of a waveguide. In the case where constant light is input through port 1, output signal light is provided from port 2. Conversely, in the case where constant light is input through port 2, output signal light is provided from port 1. Input signal light is applied through port 3 or port 4. (For the meaning of constant light, input signal light, and output signal light, refer to the description of FIGS. 1-4).

As shown in FIG. 5, port 1 branches to arms 121 and 122 at splitter 111. Port 2 branches to arms 121 and 122 at splitter 112. Arm 121 branches to ports 1 and 3 at splitter 113. Arm 121 branches to ports 2 and 4 at splitter 114. Main electrode 131 and auxiliary electrode 141 are disposed between splitter 113 and splitter 114 on arm 121. Main electrode 132 and auxiliary electrode 142 are disposed between splitter 111 and splitter 112 on arm 122.

Wavelength converter 100 employs a configuration in which input signal light as well as constant light passes through auxiliary electrode 141. There was a problem that the intensity of the input signal light was disadvantageously attenuated at auxiliary electrode 141. A wavelength converter solving this problem and a fabrication method thereof will be described in detail hereinafter based on respective embodiments.

First Embodiment

Figure 6:
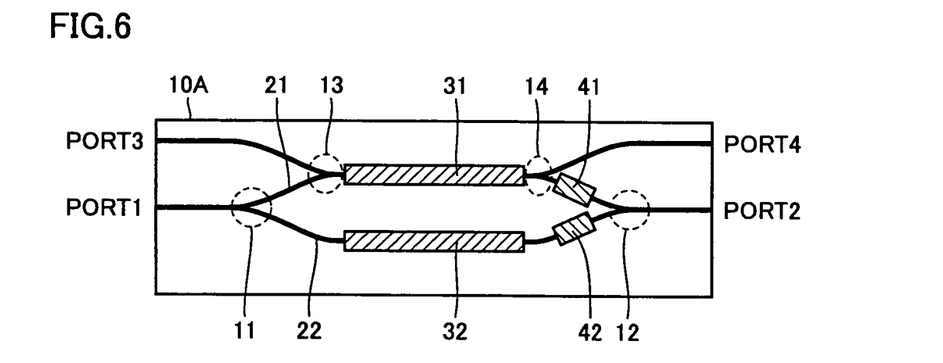
FIG. 6 schematically shows a configuration of a wavelength converter 10A in accordance with a first embodiment of the present invention.

FIG. 6 schematically shows a configuration of a wavelength converter 10A in accordance with the first embodiment of the present invention.

Referring to FIG. 6, wavelength converter 10A of the first embodiment is based on a Mach-Zehnder interferometer, and includes splitters 11-14, arms 21 and 22, main electrodes 31 and 32, and auxiliary electrodes 41 and 42. The optical path including arms 21 and 22 is formed of a waveguide.

In the case where constant light is input through port 1, output signal light is provided from port 2. In contrast, in the case where constant light is input through port 2, output signal light is provided from port 1. The input signal light is applied through port 3 or port 4. (For the meaning of constant light, input signal light and output signal light, refer to the description of FIGS. 1-4).

As shown in FIG. 6, port 1 branches to arms 21 and arm 22 at splitter 11. Port 2 branches to arm 21 and arm 22 at splitter 12. Arm 21 branches to port 1 and port 3 at splitter 13. Arm 21 branches to port 2 and port 4 at splitter 14.

Main electrode 31 is disposed between splitter 13 and splitter 14 on arm 21. Auxiliary electrode 41 is disposed between splitter 12 and splitter 14 on arm 21. Main electrode 32 and auxiliary electrode 42 are disposed between splitter 11 and splitter 12 on arm 22, assuming that main electrode 32 and auxiliary electrode 42 are disposed at the port 1 side and port 2 side, respectively, on arm 22. By virtue of such arrangement of auxiliary electrodes 41 and 42, the input signal light applied through port 3 or port 4 acts on main electrode 31 prior to auxiliary electrodes 41 and 42. Therefore, the input signal light is not affected by auxiliary electrodes 41 and 42. Thus, the intensity of the input signal light will no longer be attenuated by auxiliary electrodes 41 and 42.

Furthermore, by disposing auxiliary electrodes 41 and 42 on arms 21 and 22, respectively, at sites inclined with respect to the input/output direction of ports 1-4, increase in the device length of wavelength converter 10A due to additional auxiliary elements 41 and 42 can be suppressed. This allows the propagation loss of constant light applied to wavelength converter 10A to be suppressed.

Thus, by disposing auxiliary electrode 41 between splitter 12 and splitter 14 on arm 21, and disposing auxiliary electrode 42 between splitter 11 and splitter 12 on arm 22 in accordance with the first embodiment, the intensity of input signal light will not be attenuated by auxiliary electrodes 41 and 42.

Second Embodiment

Figure 7:
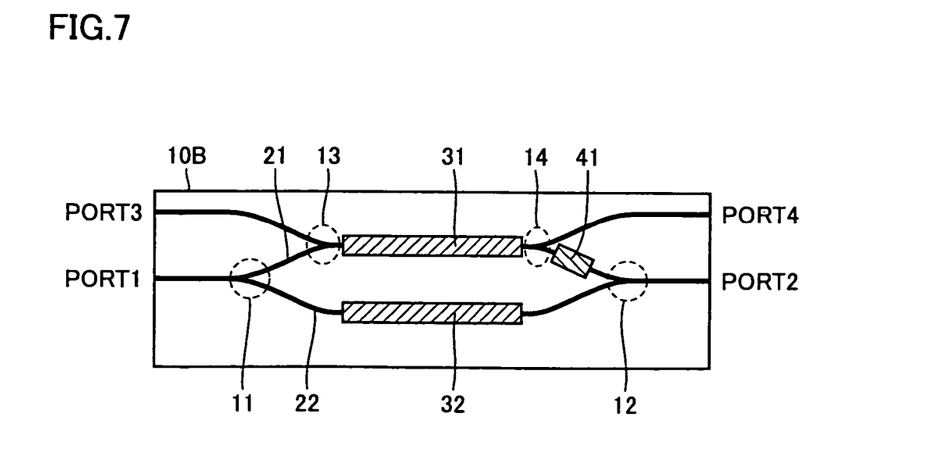
FIG. 7 schematically shows a configuration of a wavelength converter 10B in accordance with a second embodiment of the present invention.

FIG. 7 schematically shows a configuration of a wavelength converter 10B in accordance with the second embodiment of the present invention.

Referring to FIG. 7, wavelength converter 10B of the second embodiment differs from wavelength converter 10A of the first embodiment, only in that auxiliary electrode 41 is disposed between splitter 12 and splitter 14 on arm 21, and that auxiliary electrode 42 is removed. Description of elements in duplication with those of the first embodiment will not be described repeatedly here.

Since the input signal light through port 3 or port 4 acts on main electrode 31 prior to auxiliary electrode 41 due to the arrangement of auxiliary electrode 41, the input signal light will not be affected by auxiliary electrode 41. Therefore, the intensity of the input signal light will not longer be attenuated by auxiliary electrode 41.

By arranging auxiliary electrode 41 on arm 21 at a site inclined with respect to the input/output direction of ports 1-4, increase in the device length of wavelength converter 10B due to additional auxiliary electrode 41 can be suppressed. Therefore, propagation loss of constant light applied to wavelength converter 10B can be suppressed.

By arranging auxiliary electrode 41 between splitter 12 and splitter 14 on arm 21 in accordance with the second embodiment, the intensity of input signal light will no longer be attenuated by auxiliary electrode 41.

Third Embodiment

Figure 8:
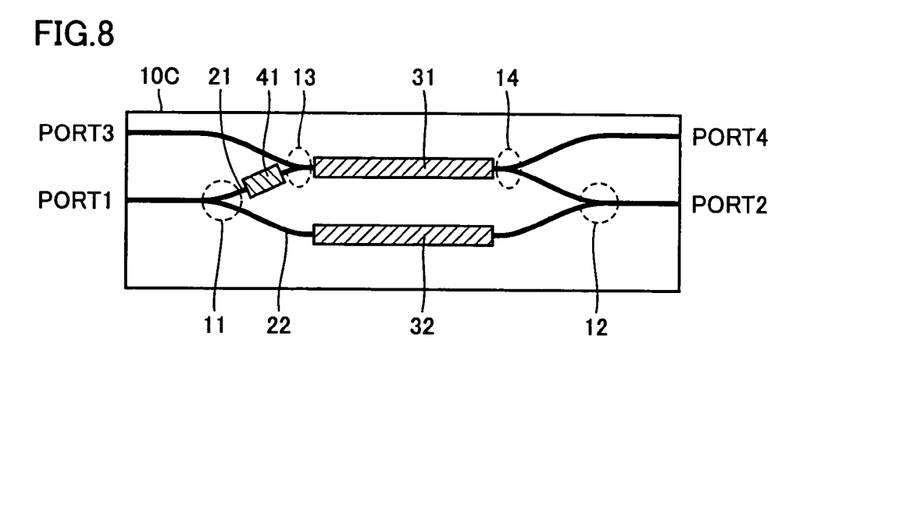
FIG. 8 schematically shows a configuration of a wavelength converter 10C in accordance with a third embodiment of the present invention.

FIG. 8 schematically shows a configuration of a wavelength converter 10C in accordance with the third embodiment of the present invention.

Referring to FIG. 8, wavelength converter 10C of the third embodiment differs from wavelength converter 10A of the first embodiment only in that auxiliary electrode 41 is disposed between splitter 11 and splitter 13 on arm 21, and that auxiliary electrode 42 is removed. Therefore, elements in duplication with those of the first embodiment will not be repeatedly described here.

The input signal light applied through port 3 or port 4 acts on main electrode 31 prior to auxiliary electrode 41 by such arrangement of auxiliary electrode 41. Therefore, the input signal light will not be affected by auxiliary electrode 41. Thus, the intensity of the input signal light will no longer be attenuated by auxiliary electrode 41.

Furthermore, increase in the device length of wavelength converter 10C due to additional auxiliary electrode 41 can be suppressed by disposing auxiliary electrode 41 at a site on arm 21 inclined with respect to the input/output direction of ports 1-4. Therefore, propagation loss of the constant light applied to wavelength converter 10C can be suppressed.

By arranging auxiliary electrode 41 between splitter 11 and splitter 13 on arm 21 in accordance with the third embodiment, the intensity of input signal light will no longer be attenuated by auxiliary electrode 41.

Fourth Embodiment

Figure 9:
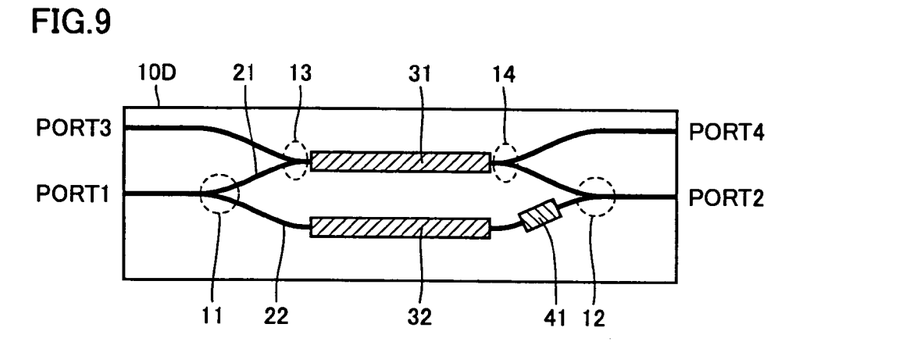
FIG. 9 schematically shows a configuration of a wavelength converter 10D in accordance with a fourth embodiment of the present invention.

FIG. 9 schematically shows a configuration of a wavelength converter 10D in accordance with a fourth embodiment of the present invention.

Referring to FIG. 9, wavelength converter 10D of the fourth embodiment differs from wavelength converter 10A of the first embodiment only in that auxiliary electrode 41 is disposed between splitter 11 and splitter 12 on arm 22, and that auxiliary electrode 42 is removed. It is assumed that main electrode 32 is disposed on arm 22 at the port 1 side whereas auxiliary electrode 42 is disposed on arm 22 at the port 2 side. Elements in duplication with those of the first embodiment will not be described repeatedly here.

By such arrangement of auxiliary electrode 41, the input signal light applied through port 3 or port 4 acts on main electrode 31 prior to auxiliary electrode 41. Therefore, the input signal light will not be affected by auxiliary electrode 41. Thus, the intensity of input signal light will no longer be attenuated by auxiliary electrode 41.

Increase in the device length of wavelength converter 10D due to additional auxiliary electrode 41 can be suppressed by disposing auxiliary electrode 41 at a site on arm 22 inclined with the respect to the input/output direction of ports 1-4. Accordingly, propagation loss of constant light applied to wavelength converter 10D can be suppressed.

By disposing auxiliary electrode 41 between splitter 11 and splitter 12 on arm 22 in accordance with the fourth embodiment, the intensity of input signal light will no longer be attenuated by auxiliary electrode 41.

Fifth Embodiment

Figure 10:
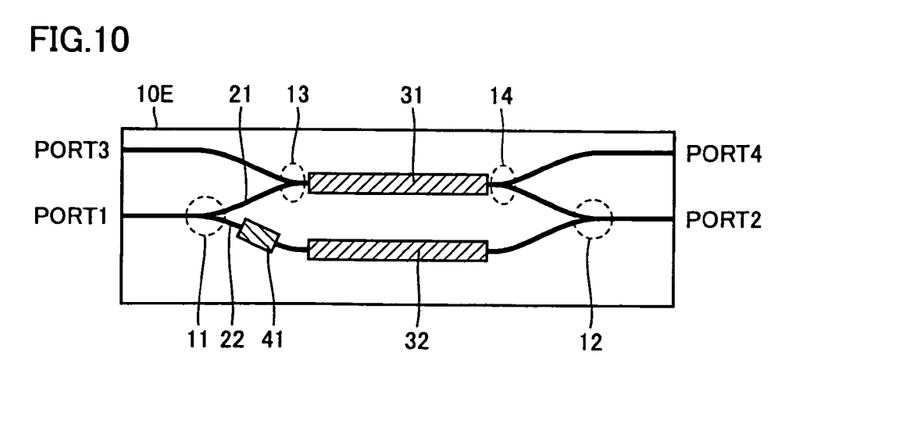
FIG. 10 schematically shows a configuration of a wavelength converter 10E in accordance with a fifth embodiment of the present invention.

FIG. 10 schematically shows a configuration of a wavelength converter 10E in accordance with a fifth embodiment of the present invention.

Referring to FIG. 10, wavelength converter 10E of the fifth embodiment differs from wavelength converter 10A of the first embodiment only in that auxiliary electrode 41 is disposed between splitter 11 and splitter 12 on arm 22, and that auxiliary electrode 42 is removed. It is assumed that main electrode 32 is disposed on arm 22 at the port 2 side whereas auxiliary electrode 42 is disposed on arm 22 at the port 1 side. Elements in duplication with those of the first embodiment will not be repeatedly described here.

Since the input signal light applied through port 3 or port 4 acts on main electrode 31 prior to auxiliary electrode 41 due to the arrangement of auxiliary electrode 41 set forth above, input signal light is not affected by auxiliary electrode 41. Therefore, the intensity of input signal light will no longer be attenuated by auxiliary electrode 41.

Increase in the device length of wavelength converter 10E due to additional auxiliary electrode 41 can be suppressed by disposing auxiliary electrode 41 at a site on arm 22 inclined with respect to the input/output selection of ports 1-4. Therefore, propagation loss of constant light applied to wavelength converter 10E can be suppressed.

By disposing auxiliary electrode 41 between splitter 11 and splitter 12 on arm 22 in accordance with the fifth embodiment, the intensity of input signal light will no longer be attenuated by auxiliary electrode 41.

Sixth Embodiment

Figure 11:
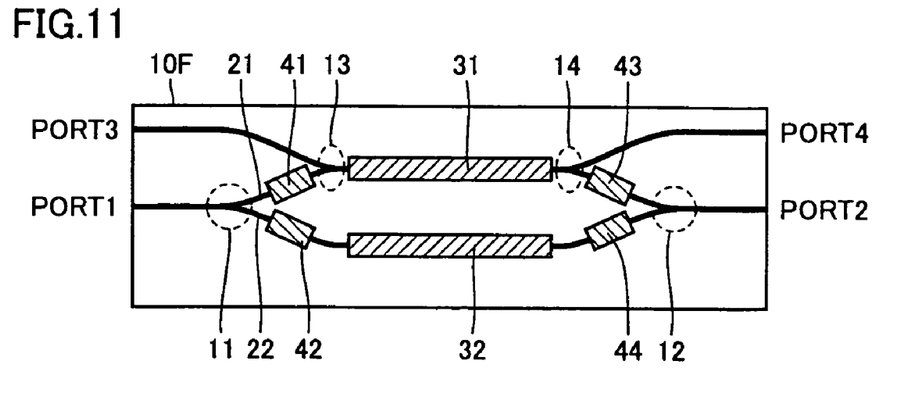
FIG. 11 schematically shows a configuration of a wavelength converter 10F in accordance with a sixth embodiment of the present invention.

FIG. 1 schematically shows a configuration of a wavelength converter 10F in accordance with a sixth embodiment of the present invention.

Referring to FIG. 11, wavelength converter 10F of the sixth embodiment differs from wavelength converter 10A of the first embodiment only in that auxiliary electrode 41 is disposed between splitter 11 and splitter 13 on arm 11, auxiliary electrode 41 is disposed between splitter 11 and splitter 12 on arm 22, an auxiliary electrode 43 is additionally disposed between splitter 12 and splitter 14 on arm 21, and an auxiliary electrode 44 is additionally disposed between splitter 11 and splitter 12 on arm 22. It is assumed that auxiliary electrode 42 and auxiliary electrode 44 are disposed on arm 22 at the port 1 side and port 2 side, respectively, and main electrode 32 is disposed between auxiliary electrode 42 and auxiliary electrode 44 on arm 22. Elements in duplication with those of the first embodiment will not be repeatedly described herein.

The input signal light applied through port 3 or port 4 acts on main electrode 31 prior to auxiliary electrodes 41-44 by such arrangement of auxiliary electrodes 41-44. Therefore, input signal light is not affected by auxiliary electrodes 41-44. Thus, the intensity of input signal light will no longer be attenuated by auxiliary electrodes 41-44.

Increase in the device length of wavelength converter 10F due to additional auxiliary electrodes 41-44 can be suppressed by disposing auxiliary electrodes 41-44 at a site on arms 21 and 22 inclined with respect to the input/output direction of ports 1-4. Accordingly, propagation loss of constant light applied to wavelength converter 10F can be suppressed.

By disposing auxiliary electrode 41 between splitter 11 and splitter 13 on arm 21, auxiliary electrode 42 between splitter 11 and splitter 12 on arm 22, auxiliary electrode 43 between splitter 12 and splitter 14 on arm 21, and auxiliary electrode 44 between splitter 11 and splitter 12 on arm 22 in accordance with the sixth embodiment, the intensity of input signal light will no longer be attenuated by auxiliary electrodes 41-44.

Seventh Embodiment

Figure 12:
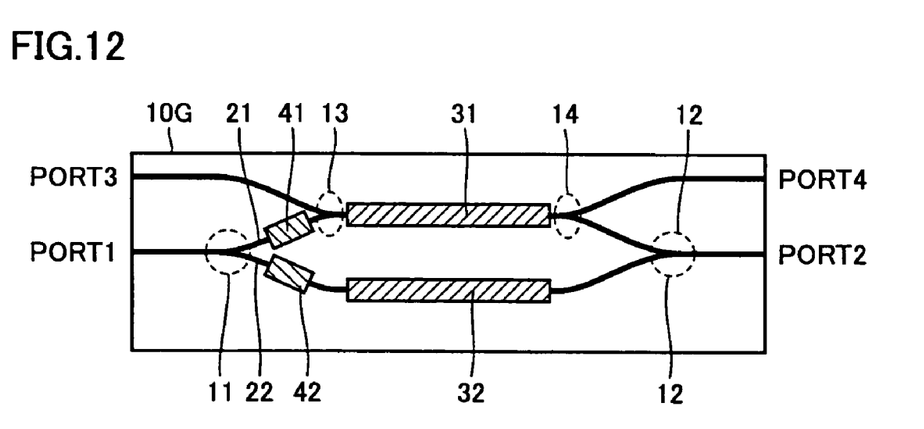
FIG. 12 schematically shows a configuration of a wavelength converter 10G in accordance with a seventh embodiment of the present invention.

FIG. 12 schematically shows a configuration of a wavelength converter 10G according to a seventh embodiment of the present invention.

Referring to FIG. 12, wavelength converter 10G of the seventh embodiment differs from wavelength converter 10A of the first embodiment only in that auxiliary electrode 41 is disposed between splitter 11 and splitter 13 on arm 21, and auxiliary electrode 42 is disposed between splitter 11 and splitter 12 on arm 22. It is assumed that main electrode 32 is disposed on arm 22 at the port 2 side whereas auxiliary electrode 42 is disposed on arm 22 at the port 1 side. Elements corresponding to those of the first embodiment will not be repeatedly described here.

Input signal light applied through port 3 or port 4 acts on main electrode 31 prior to auxiliary electrodes 41 and 42 due to the arrangement of auxiliary electrodes 41 and 42. Therefore, the input signal light is not affected by auxiliary electrodes 41 and 42. Thus, the intensity of input signal light will no longer be attenuated by auxiliary electrodes 41 and 42.

Increase in the device length of wavelength converter 10G due to additional auxiliary electrodes 41 and 42 can be suppressed by disposing auxiliary electrodes 41 and 42 at sites on arms 21 and 22 inclined with respect to the input/output direction of ports 1-4. Accordingly, propagation loss of constant light applied to wavelength converter 10G can be suppressed.

By disposing auxiliary electrode 41 between splitter 11 and splitter 13 on arm 21, and auxiliary electrode 42 between splitter 11 and splitter 12 on arm 22 in accordance with the seventh embodiment, the intensity of input signal light will no longer be attenuated by auxiliary electrodes 41 and 42.

Eighth Embodiment

A fabrication method of wavelength converters 10A-10G of the first to seventh embodiments, respectively, will be described in detail with reference to drawings, based on an exemplified fabrication method of wavelength converter 10A in accordance with the eighth embodiment. The present fabrication method can be applied to the fabrication methods of wavelength converters 10B-10G.

Figure 13A:
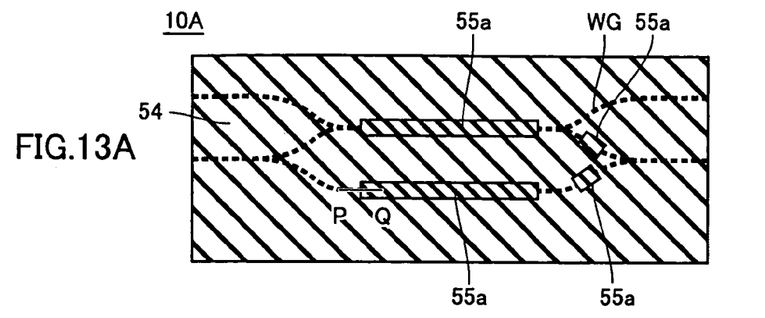
FIGS. 13A and 13B are a top view and a sectional view, respectively, of wavelength converter 10A to describe an optical amplifying layer production step in a fabrication method thereof in accordance with an eighth embodiment of the present invention.
Figure 13B:
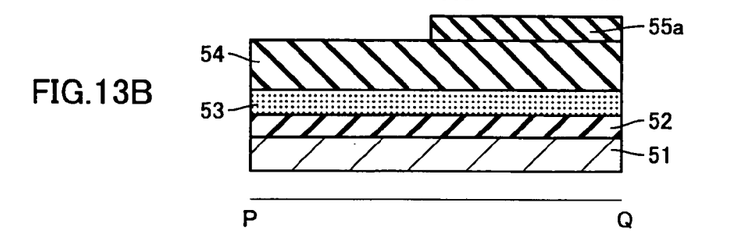

FIG. 13A is a top view of wavelength converter 10A representing an optical amplifying layer production step in the fabrication method of wavelength converter 10A. FIG. 10B is a sectional view of wavelength converter 10A taken along line PQ of FIG. 13A.

Referring to FIG. 13B, an n type InP clad layer 52, an indium gallium arsenic phosphorus (InGaAsP) optical amplifying layer 53, and a p type InP clad layer 54 are sequentially grown all over the surface on an n type indium phosphorus (InP) substrate 51. An insulation film 55a identified as a mask is provided on a part of p type InP clad layer 54. By the optical amplifying layer production step set forth above, wavelength converter 10A exhibits a top plane as shown in FIG. 13A.

Referring to FIG. 13A, the mask of insulation film 55a corresponds to the region where a main electrode (semiconductor optical amplifier) or an auxiliary electrode (phase control element) is to be formed afterwards (refer to FIG. 6). The broken line WG depicted on wavelength converter 10A in FIG. 13A corresponds to the region where a waveguide is formed afterwards (refer to FIG. 6). By an etching process applied on wavelength converter 10A shown in FIGS. 13A and 13B, wavelength converter 10A is selectively grown in accordance with whether a region is masked by insulation film 55a or not, as shown in FIGS. 14A and 14B.

Figure 14A:
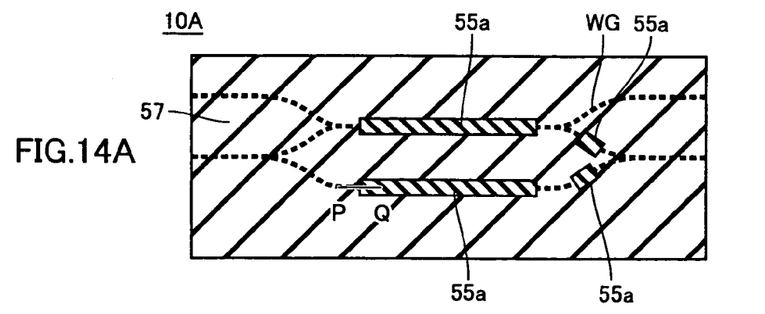
FIGS. 14A and 14B are a top view and a sectional view, respectively, of wavelength converter 10A to describe an optical waveguiding layer production step in a fabrication method thereof in accordance with the eighth embodiment of the present invention.

FIG. 14A is a sectional view of wavelength converter 10A corresponding to an optical waveguiding layer production step in the fabrication method of wavelength converter 10A. FIG. 14B is a sectional view of wavelength converter 10A taken along line PQ of FIG. 14A.

Figure 14B:
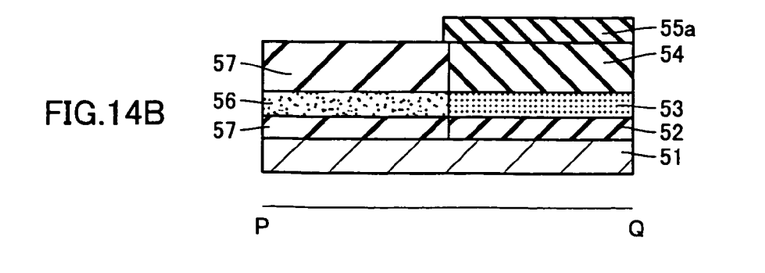

As shown in FIG. 14B, wavelength converter 10A subjected to etching selectively grows in accordance with whether a region is masked with insulation film 55a or not. At the regions below the mask of insulation film 55a, n type InP clad layer 52, InGaAsP optical amplifying layer 53 and p type InP clad layer 54 remain intact, as shown in FIG. 14B. It is to be noted that InGaAsP optical amplifying layer 53 also functions as a waveguide.

In contrast, at the regions below the region not masked with insulation film 55a, n type InP clad layer 52 and p type InP clad layer 54 have their composition modified into an i type InP layer 56, and InGaAsP optical amplifying layer 53 has its composition modified into InGaAsP optical waveguiding layer 57. This modification in composition also occurs partially below the region masked by insulation film 55a. By the optical waveguiding layer production step set forth above, wavelength converter 10A exhibits a top view as shown in FIG. 14A.

Figure 15A:
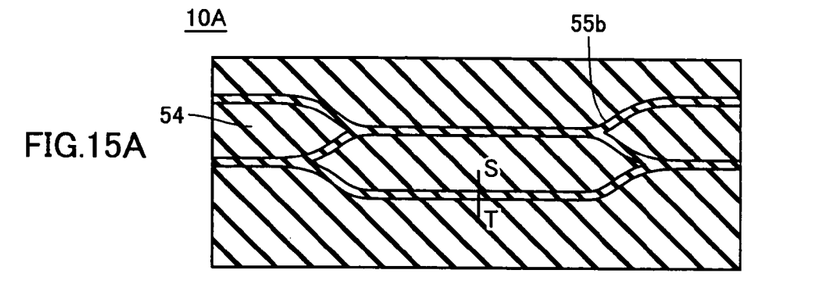
FIGS. 15A and 15B are a top view and a sectional view, respectively, of wavelength converter 10A to describe a waveguide production step in a fabrication method thereof in accordance with the eighth embodiment of the present invention.
Figure 15B:
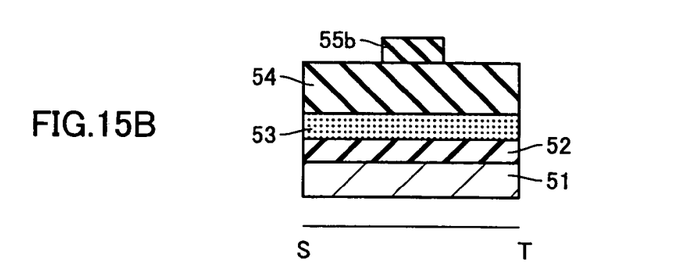

FIG. 15A is a top view of wavelength converter 10A corresponding to a waveguide production step in the fabrication method thereof. FIG. 15B is a sectional view of wavelength converter 10A taken along line ST of FIG. 15A.

Wavelength converter 10A of FIG. 15B corresponds to wavelength converter 10A of FIGS. 14A and 14B, having insulation film 55a identified as the mask removed, and an insulation film 55b identified as a new mask formed at the site where the waveguide is to be formed. In accordance with this waveguide production step, wavelength converter 10A exhibits a top view as shown in FIG. 15A. Wavelength converter 10A of FIGS. 15A and 15B is subjected to an etching process of a type different from that of FIGS. 14A and 14B, whereby wavelength converter 10A has a waveguide ridge formed along transverse line ST, as shown in FIGS. 16A and 16B.

Figure 16A:
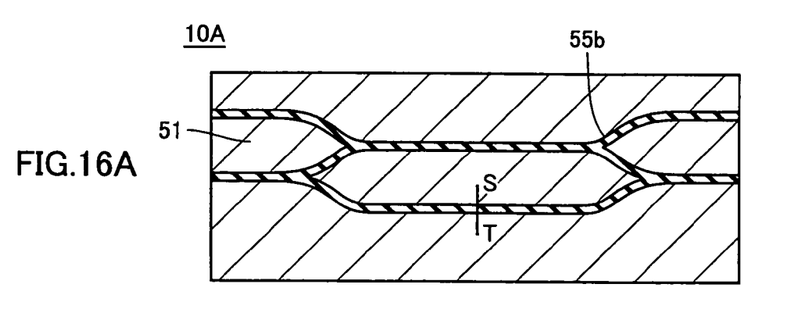
FIGS. 16A and 16B are a top view and a sectional view, respectively, of wavelength converter 10A to describe a waveguide ridge production step in a fabrication method thereof in accordance with the eighth embodiment of the present invention.

FIG. 16A is a top view of wavelength converter 10A showing a waveguide ridge production step in the fabrication method thereof. FIG. 16B is a sectional view of wavelength converter 10A taken along line ST of FIG. 16A.

Figure 16B:
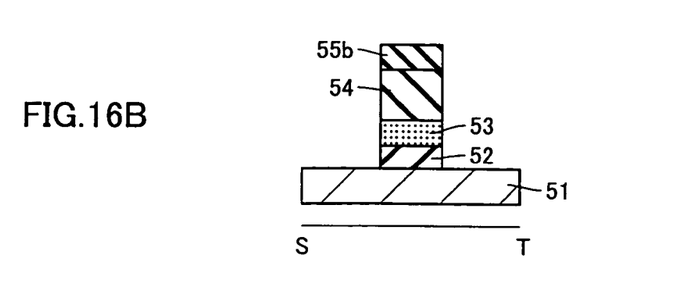

Referring to FIG. 16B, wavelength converter 10A is subjected to an etching process of a type different from that of FIGS. 14A and 14B, whereby n type InP clad layer 52, InGaAsP optical amplifying layer 53 and p type InP clad layer 54 are removed, all except in the regions below the region masked by insulation film 55b. As a result, a waveguide ridge is formed along transverse line ST in wavelength converter 10A, as shown in FIG. 16B. By this waveguide ridge production step, wavelength converter 10A exhibits a top view as shown in FIG. 16A. Insulation film 55b is removed after formation of the waveguide ridge.

Figure 17A:
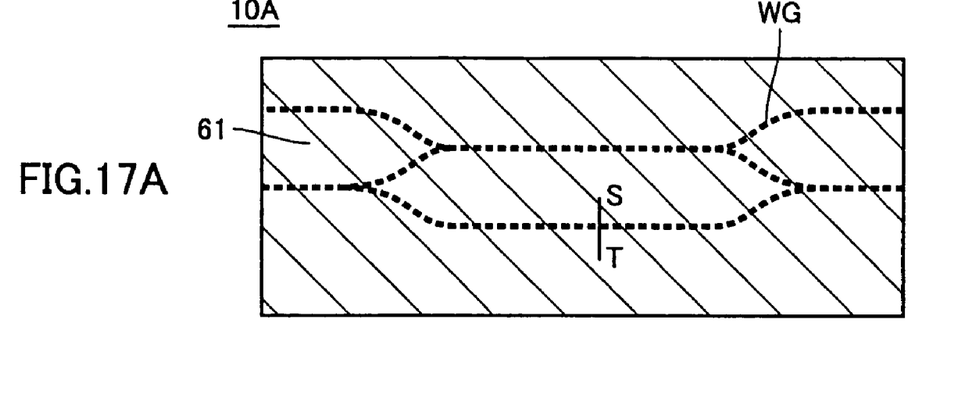
FIGS. 17A and 17B are a top view and a sectional view, respectively, of wavelength converter 10A to describe an embed growth production step in a fabrication method thereof in accordance with the eighth embodiment of the present invention.
Figure 17B:
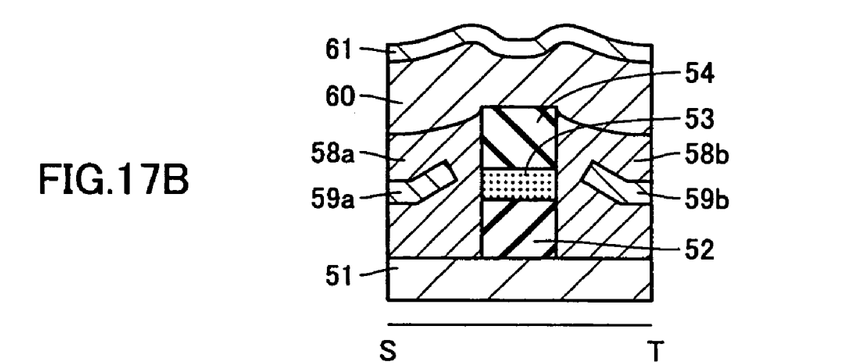

FIG. 17A is a top view of wavelength converter 10A showing an embed growth production step in the fabrication method thereof FIG. 17B is a sectional view of wavelength converter 10A taken along line ST of FIG. 17A.

Referring to FIG. 17B, p type InP layers 58a and 58b are formed on n type InP substrate 51 at respective sides of the waveguide ridge formed by the waveguide ridge production step of FIGS. 16A and 16B. Inside p type InP layers 58a and 58b, n type InP layers 59a and 59b are respectively grown in an embedded manner. Above p type InP layer 58a, p type InP clad layer 54 and p type InP layer 58b are sequentially formed a p type InP clad layer 60 and a contact layer 61.

By the embed growth production step set forth above, wavelength converter 10A exhibits a top view as shown in FIG. 17A. Broken line WG depicted on wavelength converter 10A of FIG. 17A indicates the location where InGaAsP optical amplifying layer 53 or InGaAsP waveguiding layer 57 is formed inside.

Figure 18A:
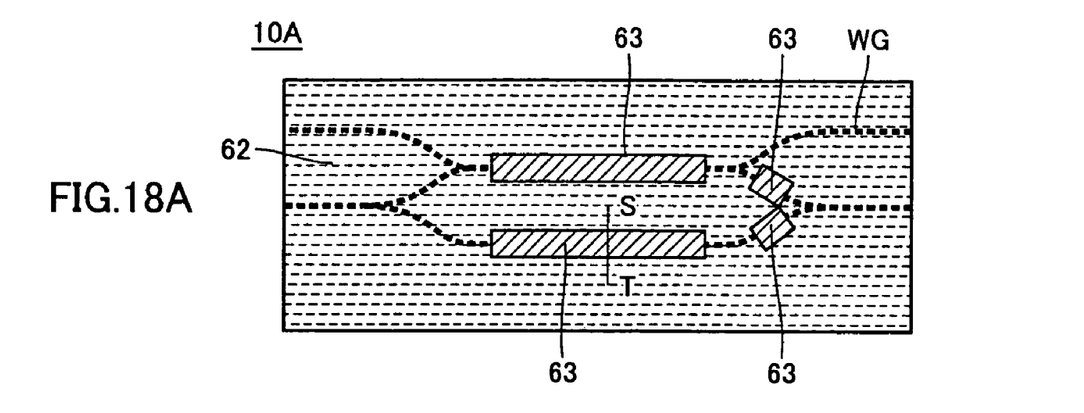
FIGS. 18A and 18B are a top view and a sectional view, respectively, of wavelength converter 10A to describe a surface electrode production step in a fabrication method thereof in accordance with the eighth embodiment of the present invention.
Figure 18B:
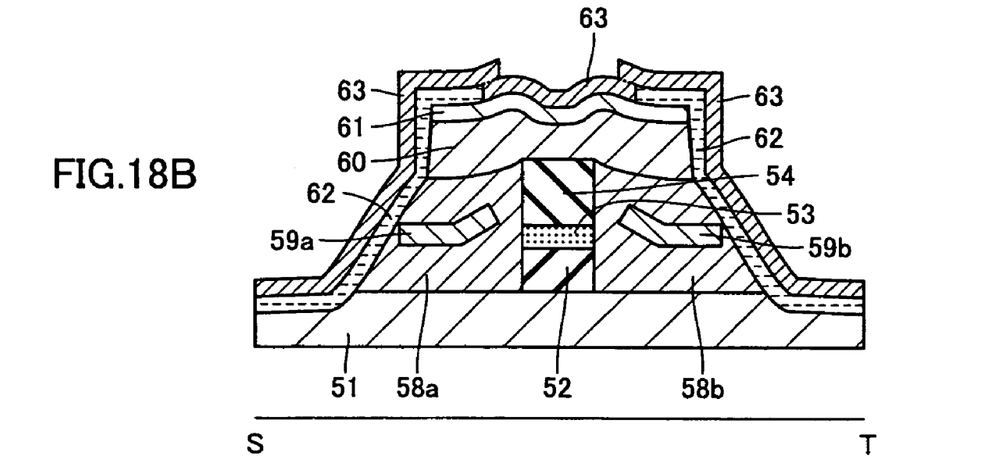

FIG. 18A is a top view of wavelength converter 10A showing a surface electrode production step in the fabrication method thereof FIG. 18B is a sectional view of wavelength converter 10A taken along line ST of FIG. 18A.

Referring to FIG. 18B, wavelength converter 10A has the side plane of p type InP layers 58a and 58b and p type InP clad layer 60 inclined so as to constitute a waveguide ridge of a mesa structure. Following the inclination process, an insulation film 62 is formed all over the surface of wavelength converter 10A.

Then, a region of insulation film 62 where main electrodes 31 and 32 or auxiliary electrodes 41 and 42 are to be formed (refer to FIG. 6) is removed, resulting in an opening in insulation film 62. Further, a contact electrode 63 is formed all over the surface. Contact electrode 63 is eventually removed except for the portion in the opening of insulation film 62. The remaining portion of contact electrode 63 functions as main electrodes 31 and 32 or auxiliary electrodes 41 and 42 of FIG. 6. By the surface electrode production step set forth above, wavelength converter 10A exhibits a top view as shown in FIG. 18A.

Then, a back electrode production step is conducted. Specifically, the backside of n type InP substrate 51 (the plane opposite to the plane subjected to the production step set forth above) is ground until the thickness of n type InP substrate 51 is approximately 100 µm. Then, the electrode companion to main electrodes 31 and 32 or auxiliary electrodes 41 and 42 of FIG. 6 is formed. The described order of the fabrication steps of wavelength converter 10A of the eighth embodiment is only an example, and not to be taken by way of limitation.

By fabricating wavelength converters 10A-10G in accordance with the production steps set forth above of the eighth embodiment, the intensity of input signal light will not be attenuated by the auxiliary electrode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical functional device comprising:
   a first port,
   a second port,
   a third port,
   a fourth port,
   a first splitter branching said first port to a first arm and a second arm,
   a second splitter branching said second port to said first arm and said second arm,
   a third splitter branching said first arm only to said first and third ports,
   a fourth splitter branching said first arm only to said second and fourth ports,
   a first semiconductor optical amplifier disposed between said third and fourth splitters, on said first arm,
   a second semiconductor optical amplifier disposed between said first and second splitters, on said second arm, and
   a phase control element disposed between said second and fourth splitters, wherein said fourth splitter is disposed between said first semiconductor optical amplifier and said phase control element.

2. The optical functional device according to claim 1, said optical functional device being employed as a wavelength converter.

3. An optical functional device comprising:
   a first port,
   a second port,
   a third port,
   a fourth port,
   a first splitter branching said first port to a first arm and a second arm,
   a second splitter branching said second port to said first arm and said second arm,
   a third splitter branching said first arm only to said first and third ports,
   a fourth splitter branching said first arm only to said second and fourth ports,
   a first semiconductor optical amplifier disposed between said third and fourth splitters on said first arm,
   a second semiconductor optical amplifier disposed between said first and second splitters on said second arm,
   a first phase control element disposed between said second and fourth splitters, wherein said fourth splitter is disposed between said first semiconductor optical amplifier and said first phase control element, and
   a second phase control element disposed between said second semiconductor optical amplifier and said second splitter on said second arm.

4. The optical functional device according to claim 3, said optical functional device being employed as a wavelength converter.

5. The optical functional device according to claim 1, wherein said third splitter branches said first arm to said first port through said first splitter.

6. The optical functional device according to claim 1, wherein said fourth splitter branches said first arm to said second port through said second splitter.

7. The optical functional device according to claim 3, wherein said third splitter branches said first arm td said first port through said first splitter.

8. The optical functional device according to claim 3, wherein said fourth splitter branches said first an to said second port though said second splitter.

* * * * *